United States Patent
Scheijgrond

(10) Patent No.: US 8,866,327 B2
(45) Date of Patent: Oct. 21, 2014

(54) DEVICE FOR THE UTILISATION OF WAVE ENERGY AND A METHOD

(75) Inventor: Peter Cornelis Scheijgrond, Gouda (NL)

(73) Assignee: IHC Holland IE B.V., Sliedrecht (NL)

( * ) Notice: Subject to any disclaimer, the term of this patent is extended or adjusted under 35 U.S.C. 154(b) by 393 days.

(21) Appl. No.: 13/055,900

(22) PCT Filed: Jul. 21, 2009

(86) PCT No.: PCT/NL2009/000152
§ 371 (c)(1),
(2), (4) Date: Apr. 5, 2011

(87) PCT Pub. No.: WO2010/011133
PCT Pub. Date: Jan. 28, 2010

(65) Prior Publication Data
US 2011/0198849 A1    Aug. 18, 2011

(30) Foreign Application Priority Data

Jul. 21, 2008 (NL) .................................. 1035727

(51) Int. Cl.
*F03B 13/12* (2006.01)
*F03B 13/18* (2006.01)
(52) U.S. Cl.
CPC ......... *F03B 13/183* (2013.01); *F05B 2240/212* (2013.01); *Y02E 10/38* (2013.01); *F05B 2210/404* (2013.01); *Y02E 10/28* (2013.01); *F05B 2240/214* (2013.01)
USPC .............................................. 290/53; 290/42
(58) Field of Classification Search
CPC ............... F03B 17/062; F03B 17/063; F05B 2210/404; F05B 2240/212; Y02E 10/28; Y02E 10/38
See application file for complete search history.

(56) References Cited

U.S. PATENT DOCUMENTS

| 4,087,202 | A | * | 5/1978 | Musgrove | ...................... 416/41 |
| 4,264,279 | A | * | 4/1981 | Dereng | ..................... 416/227 A |
| 4,313,711 | A | | 2/1982 | Lee | |

(Continued)

FOREIGN PATENT DOCUMENTS

| DE | 10065548 A1 * | 7/2002 | ................ F03D 3/02 |
| FR | 2865777 A1 | 8/2005 | |

(Continued)

OTHER PUBLICATIONS

Manabu Takao et al., "Impulse Turbine with End Plates for Wave Energy Conversion", Proceedings of the 8th International Symposium on Experimental and Computational Aerothermodynamics of Internal Flows, Jul. 2007, p. 1-6, Lyon, France.

*Primary Examiner* — Tulsidas C Patel
*Assistant Examiner* — S. Mikailoff
(74) *Attorney, Agent, or Firm* — Shewchuk IP Services, LLC; Jeffrey D. Shewchuk

(57) ABSTRACT

The invention relates to a device for the utilization of wave energy, with an increased efficiency. Thereto, the device according to the invention comprises
  a Darrieus rotor having at least two Darrieus rotor blades, wherein the Darrieus rotor has a solidity σD, and
  a Wells rotor having at least two Wells rotor blades, wherein the Wells rotor has a solidity σW,
wherein
  the Darrieus rotor and the Wells rotor are rotatable about a common axis of rotation A, and
  σW is larger than or equal to σD.

The invention also relates to a method for harnessing wave energy.

20 Claims, 8 Drawing Sheets

(56) References Cited

U.S. PATENT DOCUMENTS

| | | | |
|---|---|---|---|
| 4,325,674 A * | 4/1982 | Ljungstrom | 416/19 |
| 4,334,823 A * | 6/1982 | Sharp | 416/119 |
| 4,415,312 A * | 11/1983 | Brenneman | 416/119 |
| 4,430,044 A * | 2/1984 | Liljegren | 416/119 |
| 5,269,647 A * | 12/1993 | Moser | 415/2.1 |
| 5,299,913 A * | 4/1994 | Heidelberg | 416/197 A |
| 6,974,309 B2 * | 12/2005 | Seki | 416/227 R |
| 8,257,018 B2 * | 9/2012 | Coffey | 415/4.2 |
| 8,529,190 B2 * | 9/2013 | Naumenko | 415/4.2 |
| 2004/0170501 A1 * | 9/2004 | Seki | 416/223 R |
| 2008/0084067 A1 * | 4/2008 | Hill | 290/4 R |
| 2011/0171025 A1 * | 7/2011 | Levine et al. | 416/1 |
| 2011/0299985 A1 * | 12/2011 | Scheijgrond et al. | 416/1 |
| 2012/0007366 A1 * | 1/2012 | Belden | 290/55 |

FOREIGN PATENT DOCUMENTS

| | | | | |
|---|---|---|---|---|
| JP | 55153870 A | * | 12/1980 | F03D 3/06 |
| JP | 2003-206849 A | | 7/2007 | |
| WO | 0244558 A1 | | 6/2002 | |
| WO | 2007012195 A1 | | 2/2007 | |

* cited by examiner

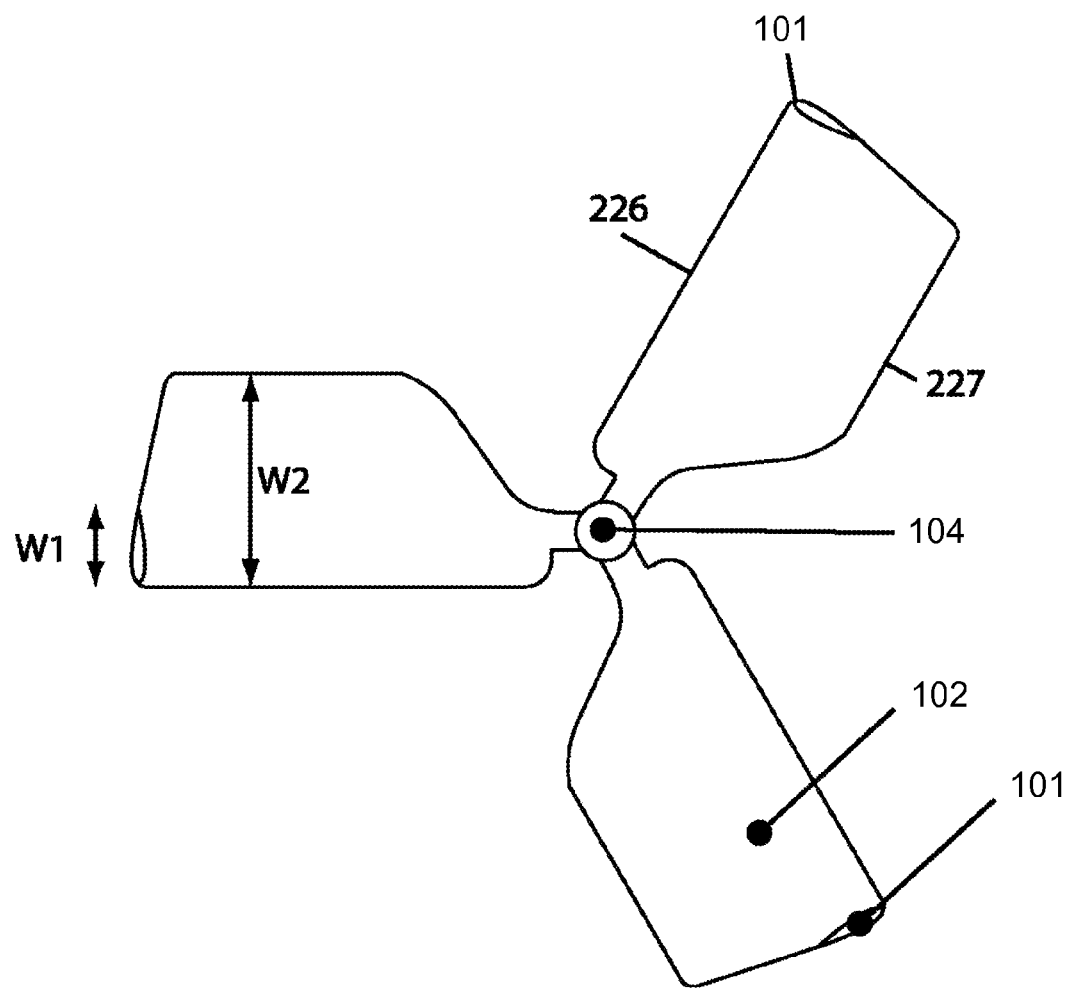

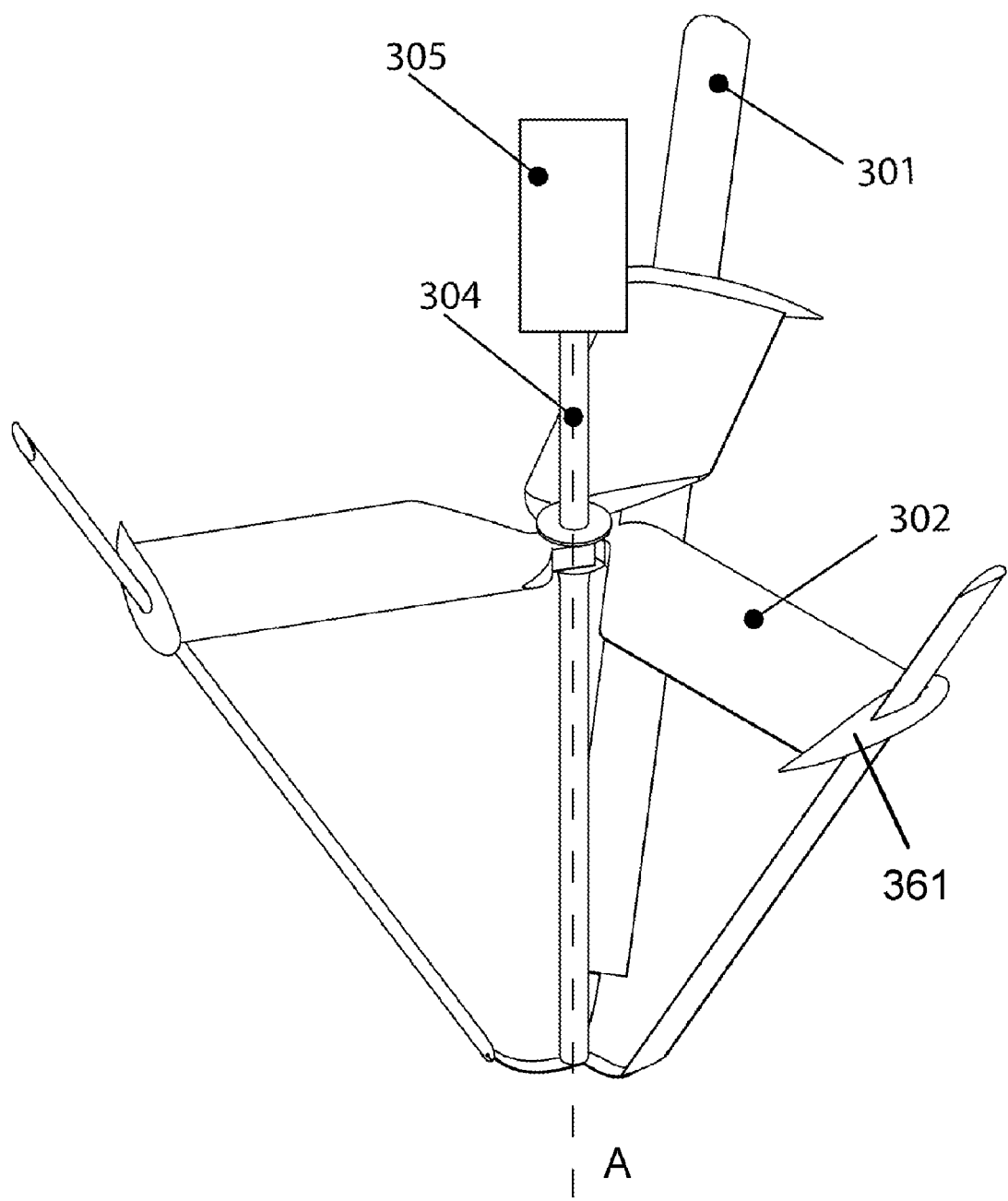

DEVICE FOR THE UTILISATION OF WAVE ENERGY AND A METHOD

The present invention relates to a device for the utilisation of wave energy, which device comprises
- a Darrieus rotor having at least two Darrieus rotor blades, and
- a Wells rotor having at least two Wells rotor blades, wherein the Darrieus rotor and the Wells rotor are rotatable about a common axis of rotation A.

Such a method is known from WO02/44558. Herewith, wave energy can effectively be harnessed.

The advantage of wave energy, namely a high energy density, also presents a problem for devices that are used for the utilisation of wave energy. Because they have to be able to withstand heavy weather conditions, they are relatively expensive. Therefore, it is required that a device for the utilisation of wave energy can harness as much energy as possible.

The object of the present invention is to provide an improved device whose energy efficiency is increased considerably, thus reducing the costs of the energy.

To this end the present invention provides a device which comprises
- a Darrieus rotor having at least two Darrieus rotor blades, wherein the Darrieus rotor has a solidity $\sigma D$, and
- a Wells rotor having at least two Wells rotor blades, wherein the Wells rotor has a solidity $\sigma W$, wherein
- the Darrieus rotor and the Wells rotor are rotatable about a common axis of rotation A, and
- $\sigma W$ is larger than or equal to $\sigma D$.

Experiments with such a device in a wave test tank have surprisingly shown that such a device can convert wave energy into mechanical energy (and thus also into hydraulic energy, electricity and optionally subsequently also into hydrogen) with an efficiency that is larger than the sum of i) the energy harnessed using a Darrieus rotor only, and the energy harnessed using a Wells rotor only. Although it is possible to have the $\sigma W$ meet the stipulated conditions by markedly increasing the number of Wells blades, in practice it will be preferred to broaden the Wells rotor blades, and the number of Wells blades is preferably equal to the number of Darrieus blades or a multiple thereof, such as 3 or preferably 2 times as many. These latter cases are in fact favourable when the Darrieus blades are connected by 3 or 2 Wells blades to an axle (that coincides with the axis of rotation). The ratio of i) the effective blade length of the blades of the Wells rotor, and ii) the effective blade length of the blades of the Darrieus rotor will usually lie between 0.01 and 3.0, such as between 0.1 and 2.5 and preferably between 0.5 and 1.5.

The application uses the following definitions:

A rotor is an assembly of two or more rotor blades, the latter also simply being referred to as blades.

A Wells rotor comprises at least two blades, wherein the blades are convex at both sides of a plane defined by the leading edge and the trailing edge of the blade. Relative to that plane a Wells blade is preferably mirror symmetrical. Wells blades predominantly extend in a radial direction relative to the axis of rotation of the Wells rotor. The plane of a blade can be at an angle with the normal of at most 15° to the axis of rotation of the Wells rotor, preferably at most 5°, and even more preferably 0°.

The solidity of a Wells rotor can be calculated using the formula $\sigma W = N \cdot Awb/Aw$ wherein
$N$ = the number of blades
$Awb$ = the surface area of a Wells rotor blade (for a rectangular blade this is the chord width c×the Effective blade length L)
$Aw$ = the Effective swept surface area of the Wells rotor.

If the blades differ from each other, then the above formula has to be applied to each of the blades, and the separately obtained outcomes of all blades have to be added up.

A Darrieus rotor comprises at least two blades, wherein the blades extend longitudinally, such that when viewed in the plane containing the axis of rotation and normal to the blade direction of travel, the longitudinal axes of the blades are at an angle with the axis of rotation of at most 60°, and preferably at most 45°. A favourable angle is for instance 0° (wherein a Darrieus blade does not intersect the axis of rotation). Preferably, the lower distal end of a Darrieus blade is situated closer to the axis of rotation of the device than the upper distal end. In that case an angle between 25-35° is most preferred.

The solidity of a Darrieus rotor can be calculated using the formula $\sigma D = N \cdot Adb/Ad$ wherein
$N$ = the number of blades
$Adb$ = the surface of a Darrieus rotor blade (for a rectangular blade this is the chord width c×the Effective blade length L)
$Ad$ = the Effective cross-sectional area of the Darrieus rotor sweep.

If the blades differ from each other, then the above formula has to be applied to each of the blades, and the separately obtained outcomes for all blades have to be added up.

Solidity can be understood easiest for a horizontal-axis wind turbine, where the direction of the flow of medium (i.e. air) runs parallel to the axis of rotation (and perpendicular to the plane in which the blades rotate) of the wind turbine.

The above solidity formulas are basically equal, but for the Wells rotor the surface area Aw is determined as if (in case of a vertical axis of rotation) the flow direction of medium (i.e. water) were parallel with the axis of rotation. For a Darrieus rotor the surface area Ad is determined (in case of a vertical axis of rotation) as if the flow direction of medium were perpendicular to the axis of rotation. For the interested layman who is not familiar with the term solidity, a few examples have been given in the description of the drawings.

The width (also referred to as chord) of a blade is the shortest crossing distance between the front side and back side of the profile (i.e., the leading edge and the trailing edge).

The term "effective" in connection with Wells and Darrieus blade length, means that only to the extent where a respective Wells or Darrieus effect is present, the blade surface in question is taken into account. In other words, only insofar as the part of the blade surface in question contributes to the generation of energy. The ordinary person skilled in the art will not need further elucidation.

In order to achieve a maximum energy output, a device according to the invention will preferably be dimensioned based on the expected wave pattern in the body of water. In that case the maximum diameter will preferably be smaller than one third, more preferably be smaller than one fourth of the wave length prevailing in the particular sea or ocean.

For even better results $\sigma W$ is at least 15% larger than $\sigma D$, and preferably at least 25% larger. In practice, a value above 200% will not readily be opted for. In practice $\sigma W$ will most preferably be between 30% and 100% larger than $\sigma D$.

Preferably, at least one Wells rotor blade is directly connected to a Darrieus rotor blade.

This further increases the efficiency of the generation of energy.

This is even more so when the distal end of the Wells rotor blade is connected with the Darrieus rotor blade.

In practice, a typical device according to the invention will contain a generator selected from i) a generator for generating electricity, and ii) a generator for generating hydraulic pressure.

The present invention also relates to a method for harnessing energy by the utilisation of wave energy, wherein a device according to the invention is placed in a body of water in which waves occur naturally. The average wave height (between trough and crest) of any such body of water is at least 50 cm per year.

A preferred embodiment is characterized in that the Wells rotor blades are situated at a depth between 0.5 and 2.0, preferably between 0.8 and 1.25 times the 5-minutes' average wave height (the average height of the waves in the body of water, as determined over a period of five minutes) below the level of the body of water.

Thus, a high energy output can be achieved.

Preferably, the upper ends of at least two Darrieus blades extend to above twice the year-average wave height (the average height of the waves in the body of water, as determined over a period of one year).

Thus, a high energy output can be achieved.

Preferably, the 5-minutes' average of the axis of rotation (the average that the axis of rotation leans away from vertical when the device is supported in the body of water, as determined over a period of five minutes) is in an orientation of less than 5° to the vertical.

In that case, the highest energy output is achieved.

Preferably, energy is selected from hydraulic energy, electricity or hydrogen gas is generated.

The hydrogen gas can be obtained by means of electrolysis with electricity generated using wave energy.

The present invention will now be illustrated by the drawings, in which

FIG. 2 shows a top plan view of a detail of the device of FIG. 1;

FIG. 3 shows a variation of FIG. 1, wherein the device has obliquely arranged Darrieus blades;

FIG. 4*a-d* show graphs of measurements illustrating the increased efficiency of a device for the utilisation of wave energy according to the invention;

FIGS. 5-8 show a number of devices according to the invention in order to elucidate the term solidity.

Figure 1:
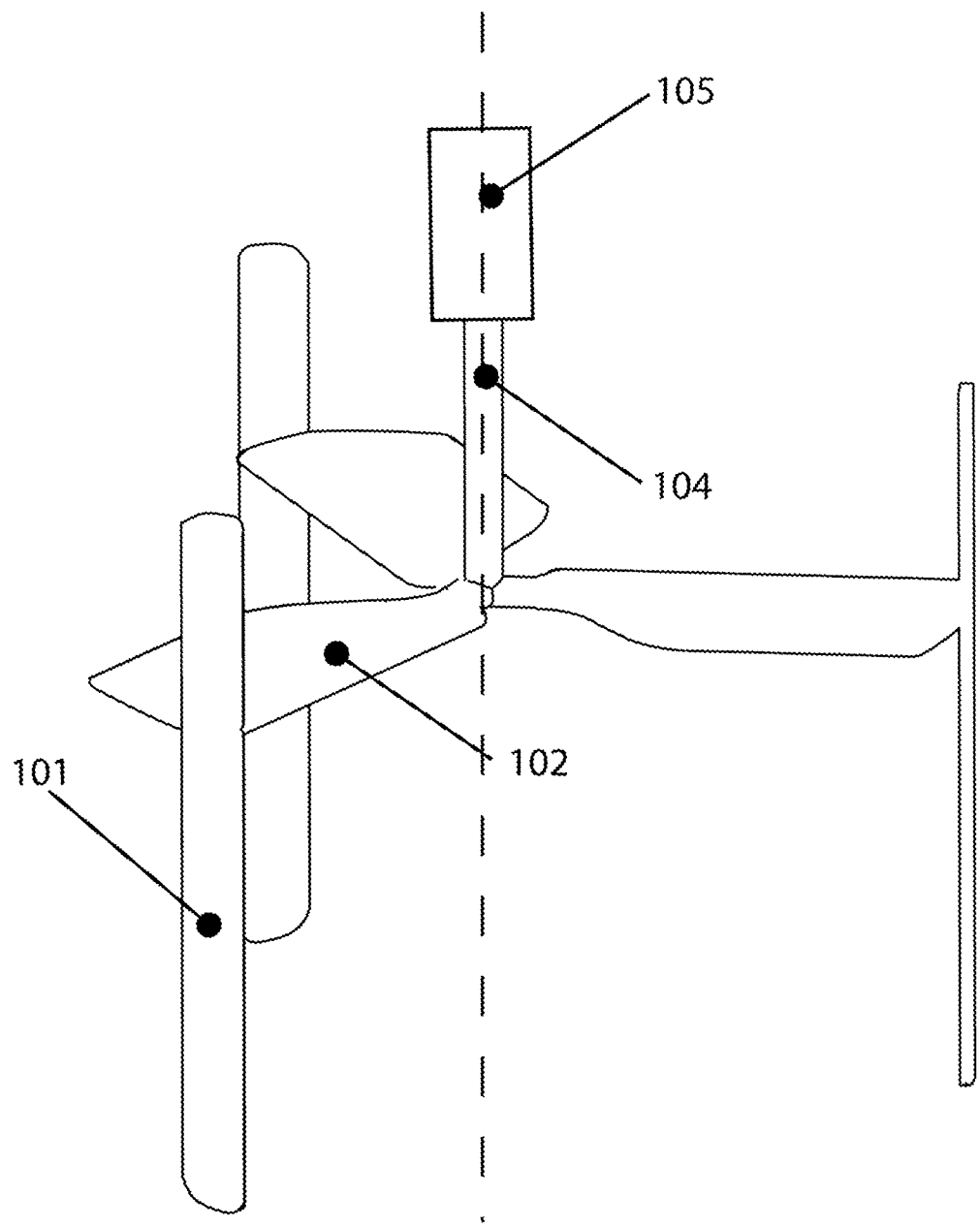
FIG. 1 shows a perspective view of a device for the utilisation of wave energy according to the invention.

FIG. 1 shows a device according to the invention for the utilisation of wave energy, which device has three first rotor blades 101 of the Darrieus type and three second rotor blades 102 of the Wells type. The second rotor blades 102 are at their distal ends attached to a central axle 104, which is connected to a generator 105 for generating electricity. The device shown in FIG. 1 is placed into the sea for instance by using a pillar (not shown), as described in the earlier application WO02/44558.

FIG. 2 shows a top plan view of the assembly of the rotor blades 101, 102 of the device of FIG. 1. It can be seen that the Wells rotor blades 102 are considerably broader than the Darrieus blades 101 (W2>W1). More specifically, the average width of a Wells rotor blade 102 is considerably larger than the average width of the Darrieus blades 101, wherein the width is calculated from the leading edge (for Wells rotor blade this is leading edge 226) to the trailing edge (for Wells rotor blade this is leading edge 227). This larger width of the Wells blades results in a larger solidity. The effective length of a Wells rotor blade is calculated from the outer circumference of a central axle 104 to the distal end of the Wells rotor blade, here to the leading edge 226 of the Darrieus rotor blade. The device shown in FIG. 2 rotates counter-clockwise.

FIG. 3 shows a variation of FIG. 1, wherein the Darrieus blades 301 are positioned obliquely and are connected to the Wells rotor blades 302 and to the axle 304 as well. The wells rotor blades 302 are also attached to the axle 304, which is connected to the generator 305 for generating electricity. This results in a strong construction giving an increased energy output.

Measurements were conducted using a device as shown in FIG. 3. It had the following dimensions:

Diameter of the axle 8 cm

Length of the Wells rotor blades including the connecting flange for connecting to the axle: 1.16 m (thus, the overall diameter of the device was 2.40 m); However, the connecting flange is not taken into account when calculating σW.

Largest thickness of a Wells blade: 80 mm;

Width W2 (see FIG. 2) of the Wells blade: 600 mm

Length of a Darrieus blade: 2.40 m

Width of the Darrieus blade: 180 mm

Largest thickness of the Darrieus blade: 33 mm

Distance to the axis of rotation at the lower end of the Darrieus rotor blade: 240 mm Angle of the Darrieus blade to the vertical: 30°.

The ratio of the σw and σd was 0.41/0.29=1.41. In other words, for the device of FIG. 3 for conducting the measurements of FIG. 4 σw was 41% greater than σd.

In order to reduce the flow resistance at the transitions between the Wells rotor blades and the Darrieus rotor blades these are provided with torpedo shaped bodies 361.

For comparison, measurements were also conducted with a similar device without Wells rotor blades (wherein the ends of the Darrieus rotor blades were connected to each other above the waves at the location of the axis of rotation), and with a device without Darrieus rotor blades. The dimensions of these comparison devices were the same as those of the device according to FIG. 3, as indicated above.

FIG. 4*a-d* display four graphs showing the conducted measurements. The measurements were conducted in a tank having a length of 55 m, 20 m and 20 m, in which artificial waves can be generated having a desired wave height and wave period. In each graph the rotor power coefficient (Cp) is plotted against the tip-speed-ratio (TSR). In the graphs, W stands for Wells only; D for Darrieus only; WD for a device with both Wells and Darrieus, and W+D for the sum of the curves of W and D. The TSR is the ratio of the velocity of the blade end of the Wells rotor relative to the maximum velocity of the wave at the surface (orbital velocity). In wind energy the TSR is an often used quantity. There is a difference between waves and wind in that wind has merely 1 component of direction, which substantially has the same magnitude across a turbine blade. Since the velocity at which water moves in a wave varies over time and decreases with the depth, the value for the maximum velocity at the surface has been used for making the graph. The maximum orbital velocity is the distance covered by a water particle at the surface along a vertical circular trajectory having a radius equal to the wave amplitude (=wave height H/2) divided by the wave period Tp; thus $2*pi*(H/2)/Tp=pi*H/Tp$ (m/s). In practice, the wave height and period are measured with a wave measuring instrument (eg. Acoustic Wave and Current profiler, Wave-Rider™ buoy), as known by the person skilled in the art. The TSR can be set at will by increasing or reducing the generator load. The measurements were conducted for four wave periods Tp (1/frequency). A Tp of 2 means that a wave has a period of 2 seconds (thus, from a first wave top to a second wave top every 2 seconds).

Figure 4A:
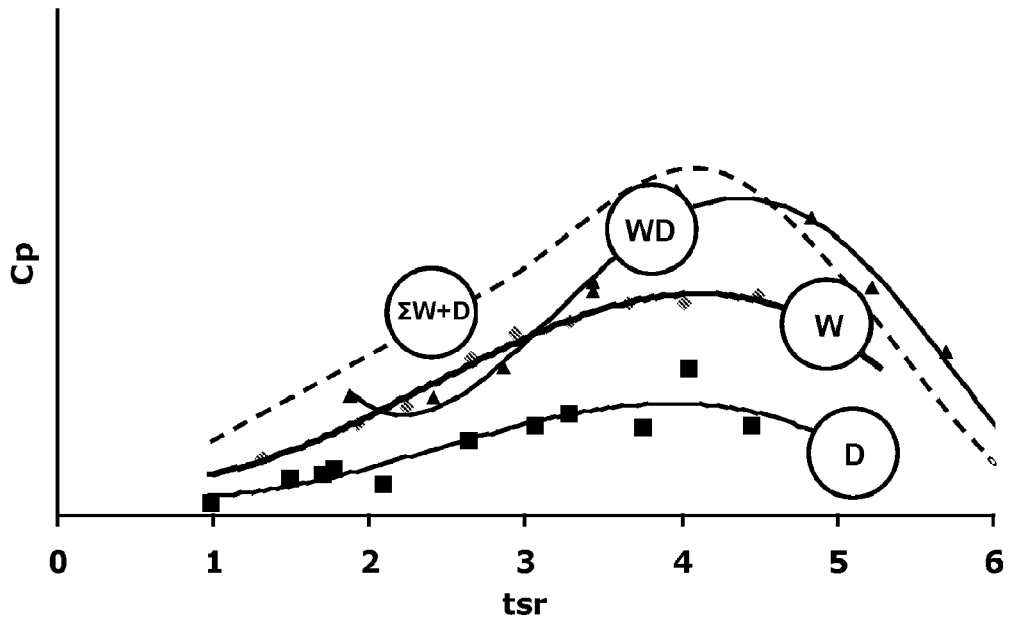
Figure 4B:
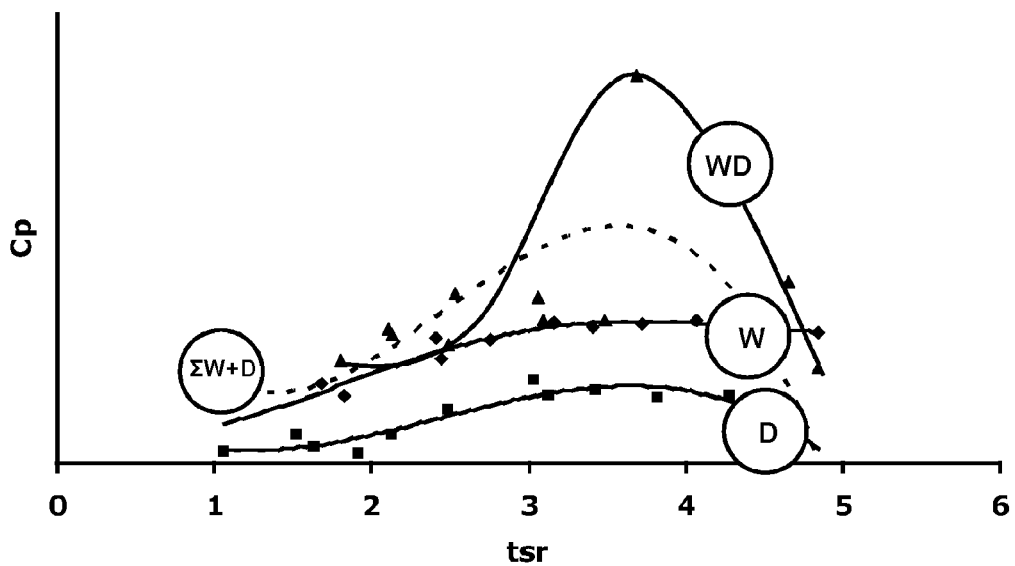
Figure 4C:
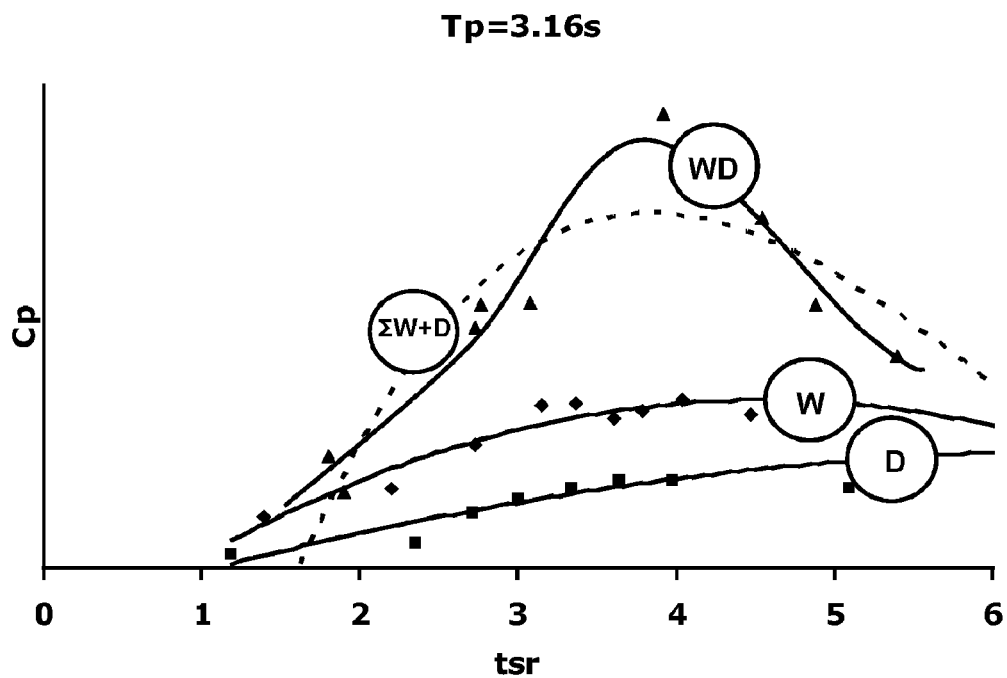
Figure 4D:
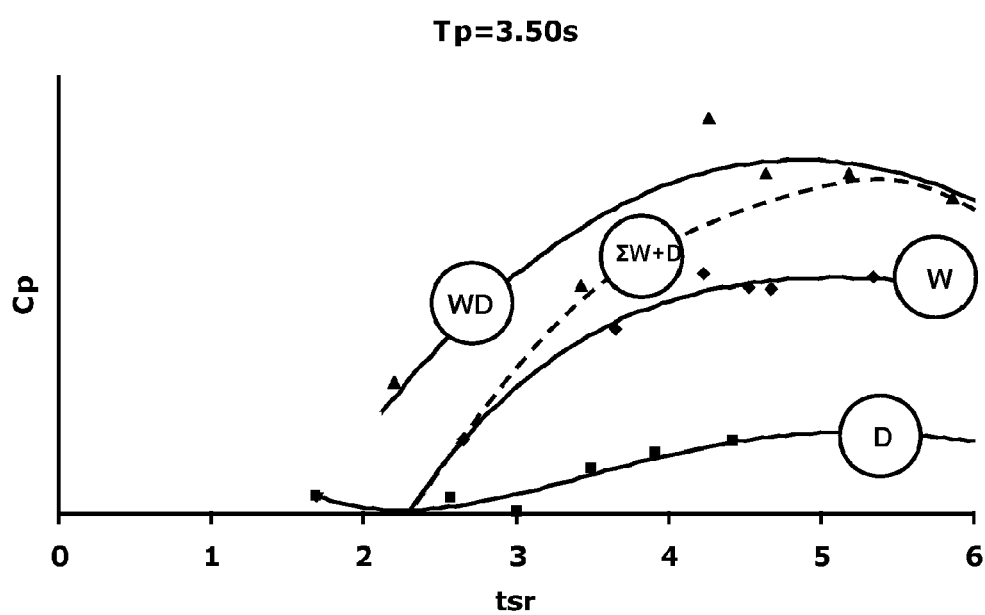
Figure 5:
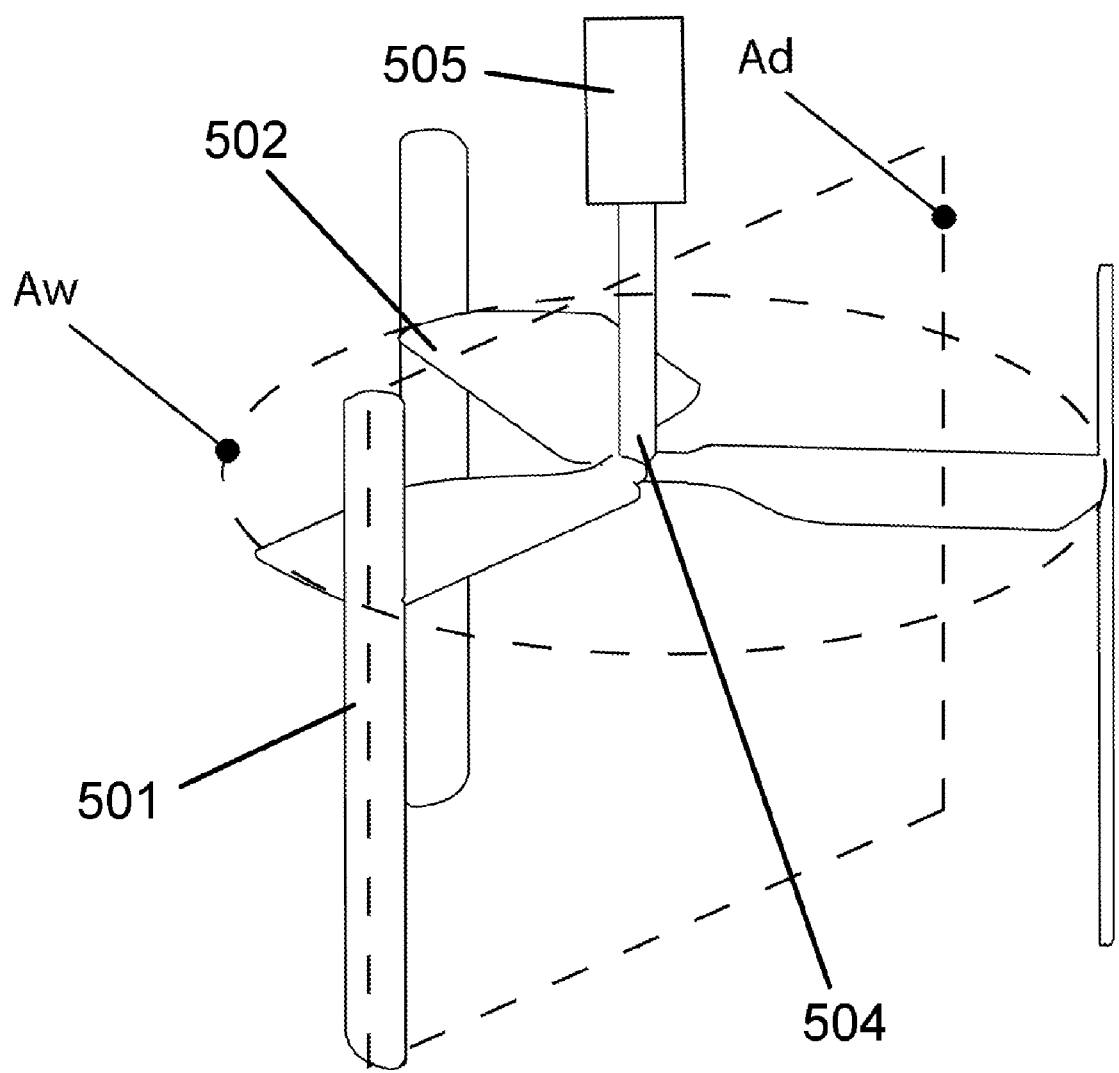
Figure 6:
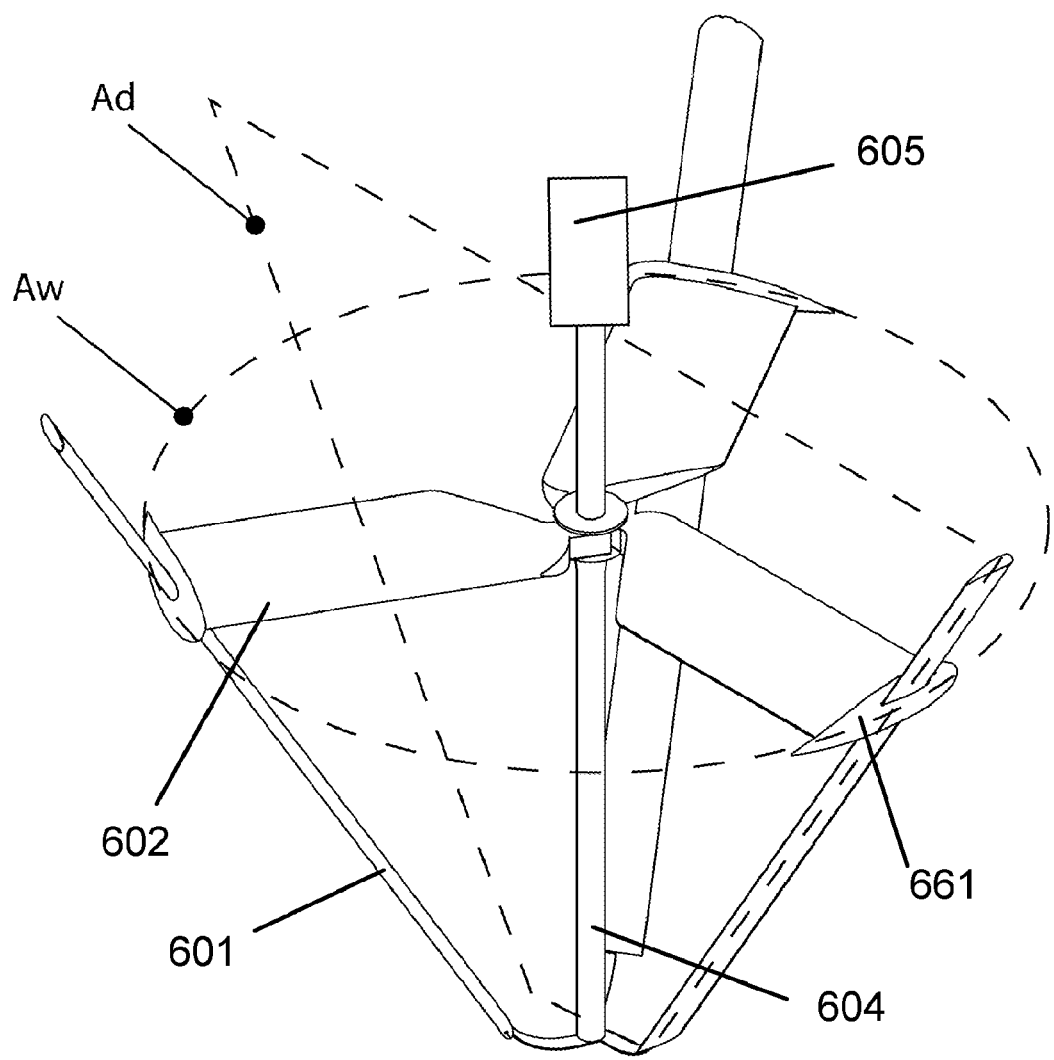
Figure 7:
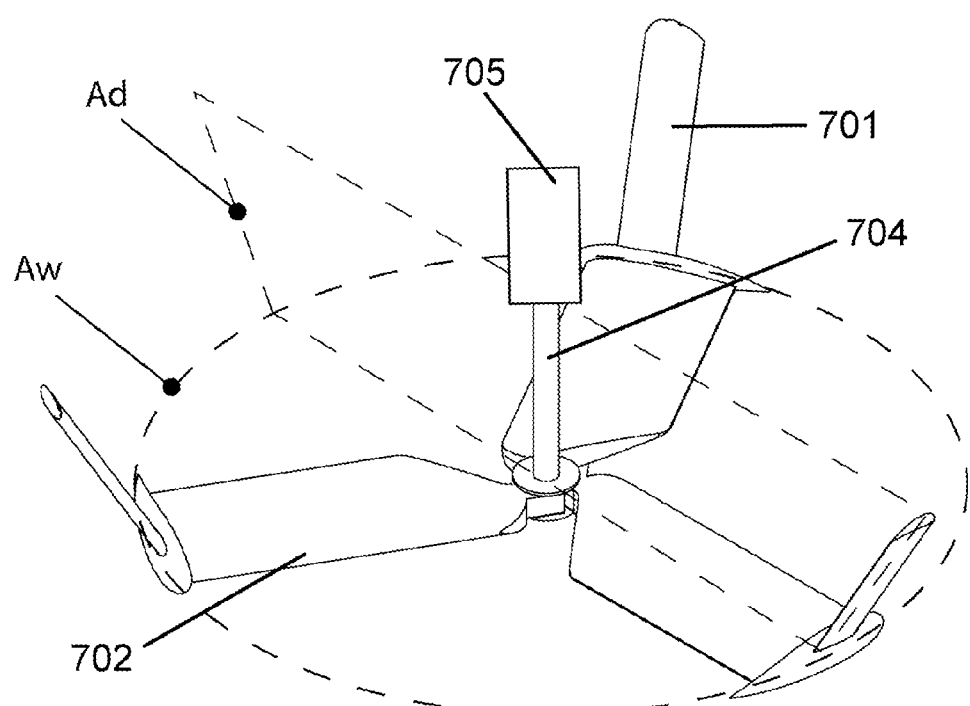

FIG. 4b-d demonstrate that at a TSR of ca. 4 the measured Cp is larger than the sum of the Cp of the Darrieus rotor and the Cp of the Wells rotor. In case of a short wave period (FIG. 4a) this synergy is not observed, but the measured Cp is still higher than that of only a Wells rotor. Therewith, using the device according to the invention achieves a considerable improvement of the efficiency at any time.

Figure 8:
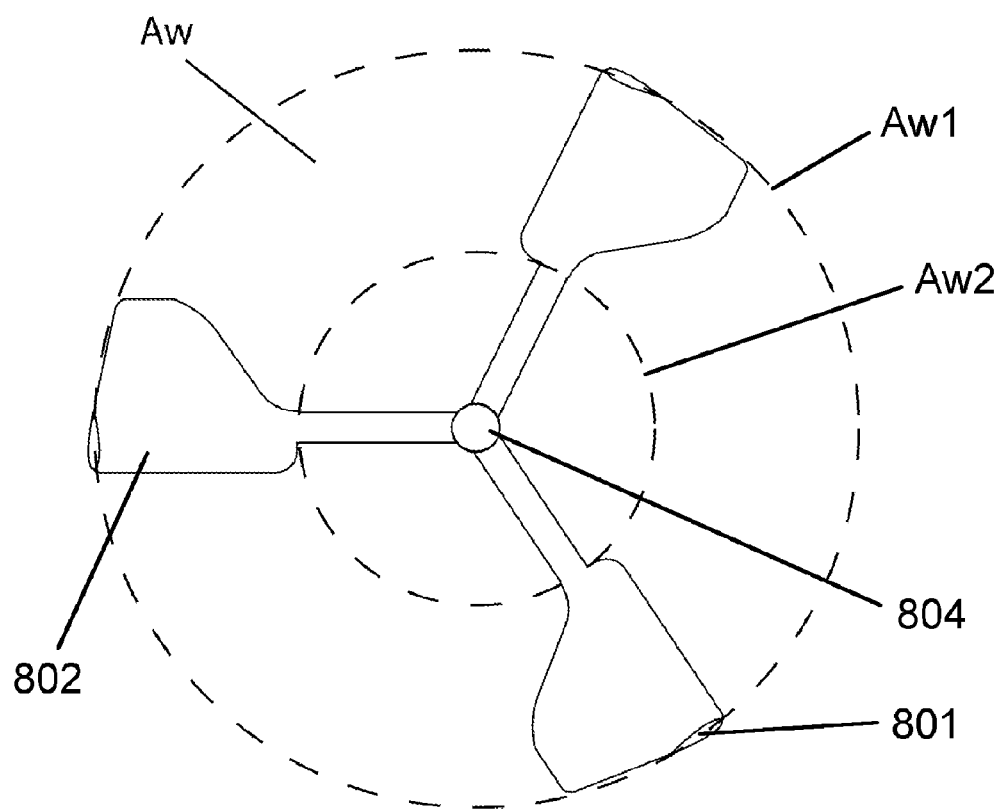

For the interested layman FIGS. 5 to 8 show the surfaces Ad (swept surface area of a Darrieus rotor) and Aw (swept surface area of a Wells rotor). Darrieus blades 501, 601, 701, 801, Wells blades 502, 602, 702, 802, axles 504, 604, 704, 804, and generator housings 505, 605, 705 can be seen. In addition, FIG. 6 also shows a torpedo shaped body 661, the function of which has already been explained at FIG. 3. FIG. 8 clearly shows that in order to determine the effective swept surface area of a Wells rotor, those parts of the Wells blades that lack a Wells profile have to be excluded from consideration. In other words Aw is Aw1−Aw2. The effective length of a Wells rotor blade in FIG. 8 is the radius of Aw1 minus the radius of Aw2.

The invention claimed is:

1. A device for the utilisation of wave energy, which device comprises
    a Darrieus rotor having at least two Darrieus rotor blades, wherein the Darrieus rotor has a Darrieus solidity ($\sigma D$) calculated under the formula $\sigma D = N \cdot Adb/Ad$, wherein
        N=the number of Darrieus rotor blades;
        Adb=the surface area of each Darrieus rotor blade; and
        Ad=the effective cross-sectional area of the Darrieus rotor sweep; and
    a Wells rotor having at least two Wells rotor blades, wherein the Wells rotor has a Wells solidity ($\sigma W$) calculated under the formula $\sigma W = N \cdot Awb/Aw$, wherein
        N=the number of Wells rotor blades;
        Awb=the surface area of a Wells rotor;
        Aw=the effective swept surface area of the Wells rotor;
    wherein
        the Darrieus rotor and the Wells rotor are rotatable about a common axis of rotation with the effective cross-sectional area of the Darrieus rotor sweep containing the common axis of rotation and with the effective swept surface area of the Wells rotor being perpendicular to the common axis of rotation, and
        the Wells solidity ($\sigma W$) is larger than or equal to the Darrieus solidity ($\sigma D$).

2. The device according to claim 1, wherein the Wells solidity ($\sigma W$) is at least 15% larger than the Darrieus solidity ($\sigma D$).

3. The device according to claim 1, wherein at least one Wells rotor blade is directly connected to a Darrieus rotor blade.

4. The device according to claim 3, wherein a distal end of each Wells rotor blade is connected to one of the Darrieus rotor blades.

5. The device according to claim 1, wherein the device contains a generator selected from i) a generator for generating electricity, and ii) a generator for generating hydraulic pressure.

6. The device according to claim 1, wherein the Wells solidity ($\sigma W$) is at least 25% larger than the Darrieus solidity ($\sigma D$).

7. A device according to claim 6, wherein the Wells solidity ($\sigma W$) is between 30% and 100% larger than the Darrieus solidity ($\sigma D$).

8. The device according to claim 1 positioned in a body of water in which waves occur naturally.

9. A device according to claim 8, in conjunction with a wave measuring instrument measuring wave height in the body of water at a location at or near the device, the body of water having a level, wherein the Wells rotor blades are situated at a depth between 0.5 and 2.0 times a 5-minutes' average wave height below the level of the body of water, wherein the 5-minutes' average wave height is an average height of naturally occurring waves in the body of water, as determined over a period of five minutes.

10. A device according to claim 9, wherein the Wells rotor blades are situated at a depth between 0.8 and 1.25 times the 5-minutes' average wave height below the level of the body of water.

11. A device according to claim 8, wherein upper ends of at least two Darrieus blades extend to above twice a year-average wave height, wherein the year-average wave height is an average height of naturally occurring waves in the body of water, as determined over a period of one year.

12. A device according to claim 8, wherein the device is supported in the body of water such that a 5-minutes' average of the axis of rotation is in an orientation of less than 5° to vertical, wherein the 5-minutes' average of the axis of rotation is an average that the axis of rotation leans away from vertical when the device is supported in the body of water, as determined over a period of five minutes.

13. A device according to claim 8, wherein energy selected from hydraulic energy, electricity or hydrogen gas is generated.

14. A method for generating energy by the utilisation of wave energy, comprising:
    placing a device in a body of water at a location in which waves occur naturally, the device comprising:
        a Darrieus rotor having at least two Darrieus rotor blades, wherein the Darrieus rotor has a solidity ($\sigma D$) calculated under the formula $\sigma D = N \cdot Adb/Ad$, wherein
            N=the number of Darrieus rotor blades;
            Adb=the surface area of each Darrieus rotor blade; and
            Ad=the effective cross-sectional area of the Darrieus rotor sweep; and
        a Wells rotor having at least two Wells rotor blades, wherein the Wells rotor has a solidity ($\sigma W$) calculated under the formula $\sigma W = N \cdot Awb/Aw$, wherein
            N=the number of Wells rotor blades;
            Awb=the surface area of a Wells rotor;
            Aw=the effective swept surface area of the Wells rotor;
        wherein
            the Darrieus rotor and the Wells rotor are rotatable about a common axis of rotation with the effective cross-sectional area of the Darrieus rotor sweep containing the common axis of rotation and with the effective swept surface area of the Wells rotor being perpendicular to the common axis of rotation, and
            the Wells solidity ($\sigma W$) is larger than or equal to the Darrieus solidity ($\sigma D$); and
    using rotation of the Darrieus rotor and the Wells rotor caused by orbital motion of the naturally occurring waves to generate energy.

15. A method according to claim 14, further comprising:
    measuring wave height with a wave measuring instrument placed in the body of water at a location at or near the device, the body of water having a level; and situating the Wells rotor blades at a depth between 0.5 and 2.0 times a 5-minutes' average wave height below the level of the body of water, wherein the 5-minutes' average wave height is an average height of naturally occurring waves in the body of water, as determined over a period of five minutes.

16. A method according to claim 15, wherein the Wells rotor blades are situated at a depth between 0.8 and 1.25 times the 5-minutes' average wave height below the level of the body of water.

17. A method according to claim 14, wherein upper ends of at least two Darrieus blades extend to above twice a year-average wave height, wherein the year-average wave height is an average height of naturally occurring waves in the body of water, as determined over a period of one year.

18. A method according to claim 14, wherein the device is supported in the body of water such that a 5-minutes' average of the axis of rotation is in an orientation of less than 5° to vertical, wherein the 5-minutes' average of the axis of rotation is an average that the axis of rotation leans away from vertical when the device is supported in the body of water, as determined over a period of five minutes.

19. A method according to claim 14, wherein energy selected from hydraulic energy, electricity or hydrogen gas is generated.

20. A method according to claim 14, wherein the Wells solidity ($\sigma W$) is between 30% and 100% larger than the Darrieus solidity ($\sigma D$).

* * * * *